E. A. BEERS.

DRAFT-EQUALIZER.

No. 6,949. Reissued Feb. 22, 1876.

WITNESSES:

Jas. E. Hutchinson.

John R. Young

INVENTOR.

Edwin A. Beers, by

Prindle and Lockie Attys.

N. PETERS, PHOTO-LITHOGRAPHER, WASHINGTON, D. C.

UNITED STATES PATENT OFFICE.

EDWIN A. BEERS, OF DE KALB CENTRE, ILLINOIS.

IMPROVEMENT IN DRAFT-EQUALIZERS.

Specification forming part of Letters Patent No. 159,558, dated February 9, 1875; reissue No. 6,949, dated February 22, 1876; application filed February 4, 1876.

*To all whom it may concern:*

Be it known that I, EDWIN A. BEERS, of De Kalb Centre, De Kalb county, State of Illinois, did invent certain new and useful Improvements in Draft-Equalizers, for which Letters Patent No. 159,558 were issued to me upon the 9th day of February, 1875, which Letters Patent have been found defective, in that the specification and claims do not cover and embrace all of the original invention, as set forth in the application filed in the Patent Office on the 28th day of December, 1874.

Now, therefore, being desirous of re-issuing said Letters Patent, herewith surrendered, I have prepared, and do hereby declare that the following is, a full, clear, and exact description of the said invention, reference being had to the accompanying drawings, making a part of this specification, in which—

Figure 1:
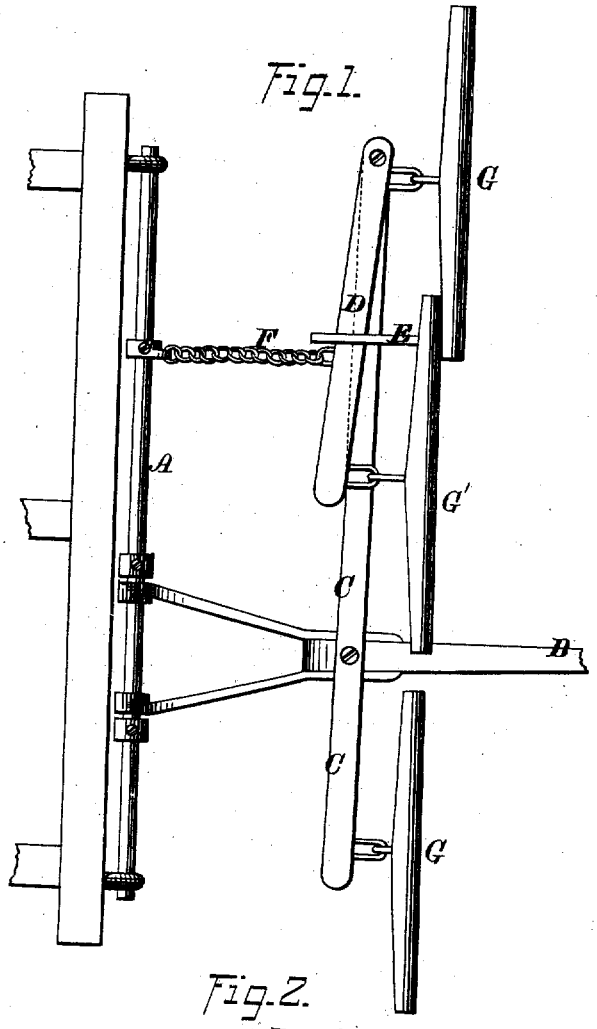
Figure 2:
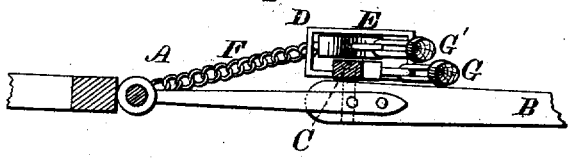

Figure 1 is a plan view of my improved device, and Fig. 2 is a side elevation of the same.

Letters of like name and kind refer to like parts in each of the figures.

The design of my invention is to enable three horses to be employed abreast in the draft of agricultural machines, wheeled vehicles, &c.; and consists in the combination and arrangement of the several parts, substantially as and for the purpose hereinafter specified.

In the annexed drawings, A represents a bar that is secured to the front of a wagon or other vehicle, to which a tongue or pole, B, is attached in any ordinary manner. Attached to or upon the pole B, at a suitable distance in advance of its rear end, is an evener, C, which latter is pivoted to the former at a point about one-third its length from one end. Pivoted to or upon the end of the longest arm of the evener C is a lever, D, which from thence extends inward about two-thirds the distance between said end and the pole B, and is secured in vertical position and its horizontal motion limited by means of a strap, E, which is secured to or upon said evener and encircles said lever. From a point about one-third the length of the lever D from its inner end a chain, F, extends between, and is secured to said lever and the bar A, and limits the forward movement of the former so as to prevent it from passing beyond the line of the pivoted bearing of the evener.

A whiffletree, G, attached to each end of the evener, and a third whiffletree, G′, attached to the inner end of the lever D, completes the device, which operates as follows: The horse attached to the short arm of the evener pulls just one third of the load, such being his leverage as compared with the horses attached to the opposite arm. The middle horse exerts two-thirds of his strength upon the load through the chain F, and one-third against the left-hand horse, while the latter, from his position, just balances the power of the other horses, and by thus equalizing their action upon the load prevents side draft.

Having thus fully set forth the nature and merits of my invention, what I claim as new is—

In combination with the bar A (or its equivalent) and the pole B, the evener C, lever D, chain F, and whiffletrees G and G′, said parts being arranged to operate in the manner and for the purpose substantially as specified.

In testimony whereof I have hereunto set my hand this 25th day of January, 1876.

EDWIN A. BEERS.

Witnesses:

EDWIN WAITE,

O. S. HOLCOMB.